United States Patent [19]
Orenstein et al.

[11] Patent Number: 5,787,026
[45] Date of Patent: Jul. 28, 1998

[54] METHOD AND APPARATUS FOR PROVIDING MEMORY ACCESS IN A PROCESSOR PIPELINE

[75] Inventors: Doron Orenstein, Haifa, Israel; Millind Mittal, S. San Francisco, Calif.; Ofri Wechsler, Ramat-Ishai, Israel

[73] Assignee: Intel Corporation, Santa Clara, Calif.

[21] Appl. No.: 575,780

[22] Filed: Dec. 20, 1995

[51] Int. Cl.$^6$ .............................. G06F 9/302; G06F 9/38
[52] U.S. Cl. ................... 364/736.05; 395/394; 395/562; 395/563
[58] Field of Search ............................ 364/736, 736.05; 395/394, 562, 563

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,644,466 | 2/1987 | Saito | 395/394 |
| 4,707,800 | 11/1987 | Montrone et al. | 364/788 |
| 4,771,379 | 9/1988 | Ando et al. | 364/200 |
| 4,933,841 | 6/1990 | Mori et al. | 395/584 |
| 4,989,168 | 1/1991 | Kuroda et al. | 364/715.09 |
| 5,095,457 | 3/1992 | Jeong | 364/758 |
| 5,187,679 | 2/1993 | Vassiliadis | 364/786 |
| 5,394,515 | 2/1995 | Lentz et al. | 395/115 |
| 5,450,607 | 9/1995 | Kowalczyk et al. | 395/800 |
| 5,454,090 | 9/1995 | Fleck et al. | 395/375 |
| 5,454,117 | 9/1995 | Puziol et al. | 395/800 |
| 5,488,729 | 1/1996 | Vegesna et al. | 395/385 |
| 5,497,499 | 3/1996 | Garg et al. | 395/393 |
| 5,509,130 | 4/1996 | Trauben et al. | 395/391 |
| 5,517,438 | 5/1996 | Dao-Trong et al. | 364/748 |
| 5,522,052 | 5/1996 | Inoue et al. | 395/392 |
| 5,537,606 | 7/1996 | Byrne | 395/800 |
| 5,555,384 | 9/1996 | Roberts et al. | 395/392 |

OTHER PUBLICATIONS

J. Shipnes, *Graphics Processing with the 88110 RISC Microprocessor*, IEEE (1992), pp. 169–174.
*MC88110 Second Generation RISC Microprocessor User's Manual*, Motorola Inc. (1991).
*Errata to MC88110 Second Generation RISC Microprocessor User's Manual*, Motorola Inc. (1992), pp. 1–11.
*MC88110 Programmer's Reference Guide*, Motorola Inc. (1992), pp. 1–4.
*0860™ Microprocessor Family Programmer's Reference Manual*, Intel Corporation (1992), Ch. 1, 3, 8, 12.
R.B. Lee, *Accelerating Multimedia With Enhanced Microprocessors*, IEEE (Apr. 1995), pp. 22–32.
*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

(List continued on next page.)

*Primary Examiner*—Reba I. Elmore
*Assistant Examiner*—Robert J. Dolan
*Attorney, Agent, or Firm*—Blakely, Sokoloff, Taylor & Zafman

[57] ABSTRACT

The invention provides a method and apparatus for providing operand reads in a processor pipeline. According to one aspect of the invention, a method is described for executing an instruction in a computer pipeline that requires different operands be read from the same register file in different stages of the computer pipeline. According to another aspect of the invention, a method is described for executing an instruction in a processor pipeline. According to this method, at least a first operand is read from a register file in a first stage of the processor pipeline. If execution of the instruction causes the processor to place the first operand in a storage area other than the register file, then the first operand in written to that storage area in a subsequent stage of the processor pipeline. Otherwise, one or more ALU operations are performed on the first operand and at least a second operand in a different subsequent stage of the processor pipeline.

35 Claims, 8 Drawing Sheets

OTHER PUBLICATIONS

L. Gwennap, *New PA-RISC Processor Decodes MPEG Video*, Microprocessor Report (Jan. 1994), pp. 16, 17.

SPARC Technology Business, *UltraSPARC Multimedia Capabilities On-Chip Support for Real-time Vieo and Advanced Graphics*, Sun Microsystems (Sep. 1994).

Y. Kawakami et al., LSI Applications: *A Single-Chip Digital Signal Processor for Voiceband Applications*, Solid State Circuits Conference, Digest of Technical Papers; IEEE International (1980).

*Pentium Processor User's Manual, vol. 3: Architecture and Programming Manual*, Intel Corporation (1993), Ch. 1,3,4, 6,8, and 18.

M. Johnson, *Superscalar Microprocessor Design*, P.T.R. Prentice–Hall, Inc. (1991) Ch 1,2,3.

B. Case, *Philips Hopes to Displace DSPs with VLIW*, Microprocessor Report (Dec. 94), pp. 12–18.

G. Wyant and T. Hammerstrom, *How Microprocessors Work*, Ziff–Davis Press (1994) Ch 28–31.

N. Margulis, *I860 Microprocessor Architecture*, McGraw Hill, Inc. (1990) Ch. 6, 7,8, 10,11.

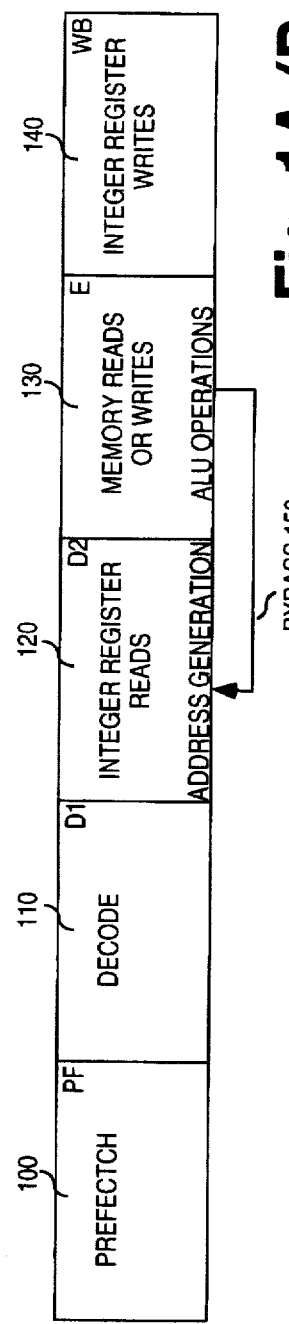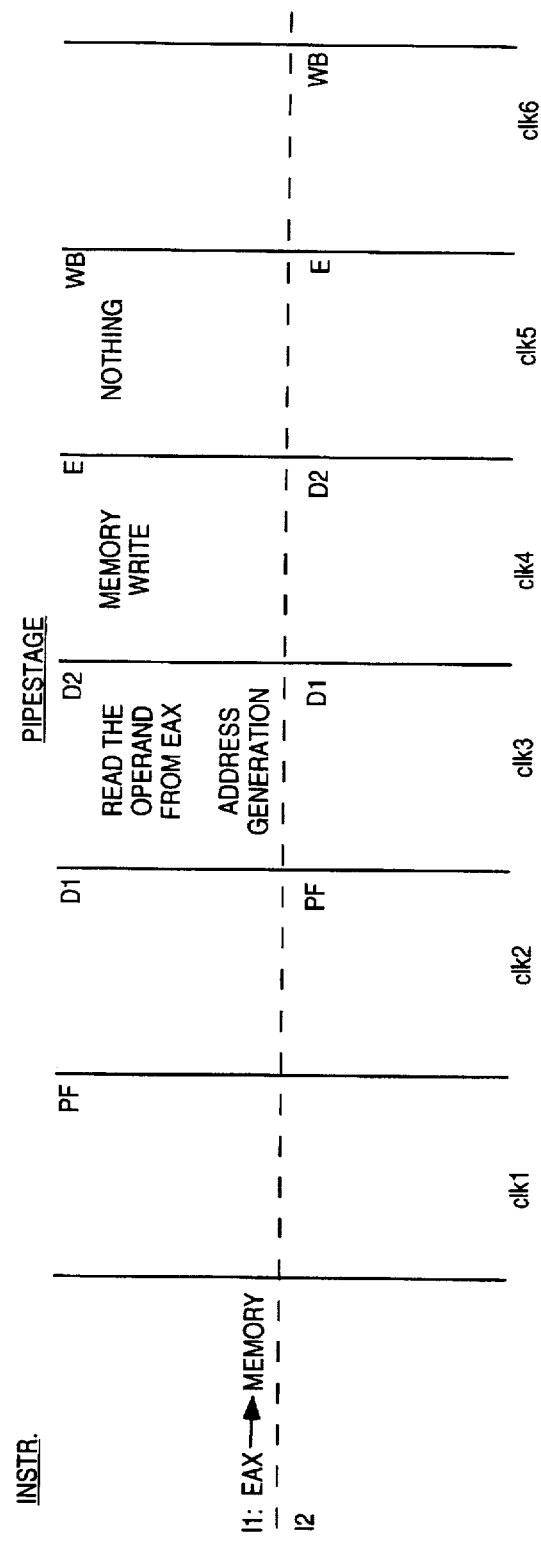
Fig. 1A (Prior Art)
Fig. 1B (Prior Art)

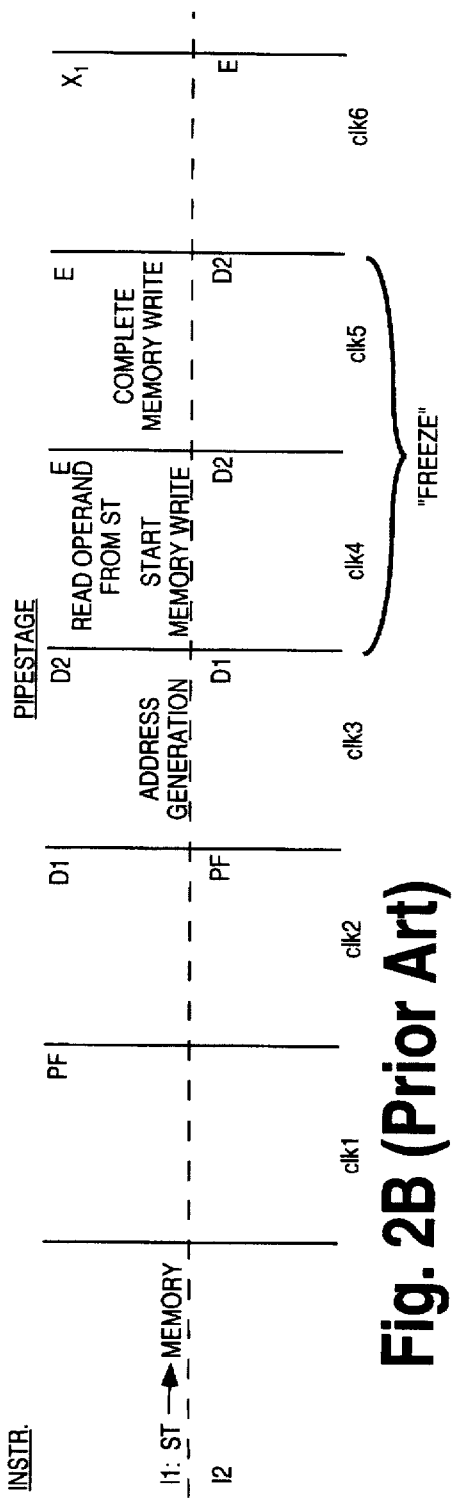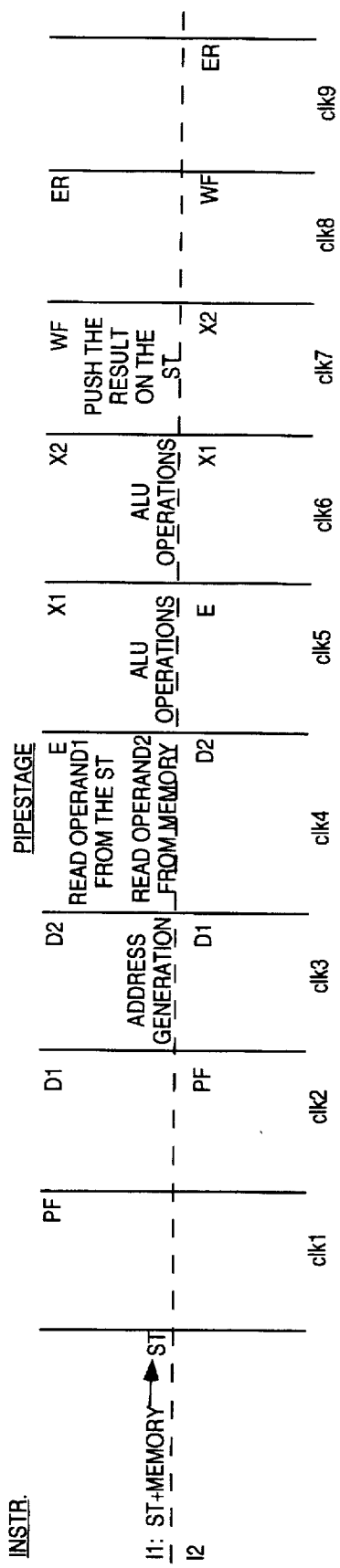
Fig. 2B (Prior Art)
Fig. 2C (Prior Art)

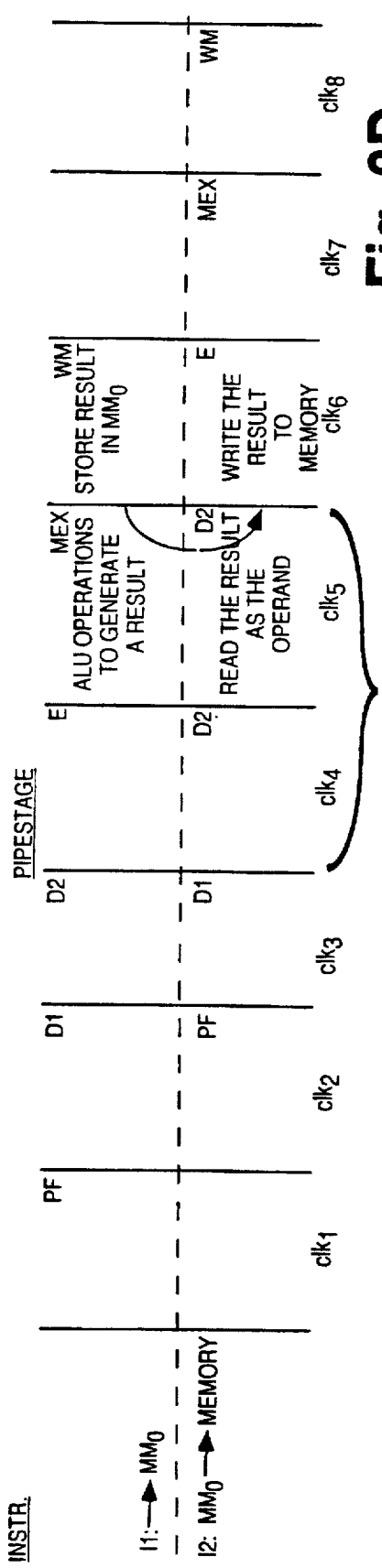
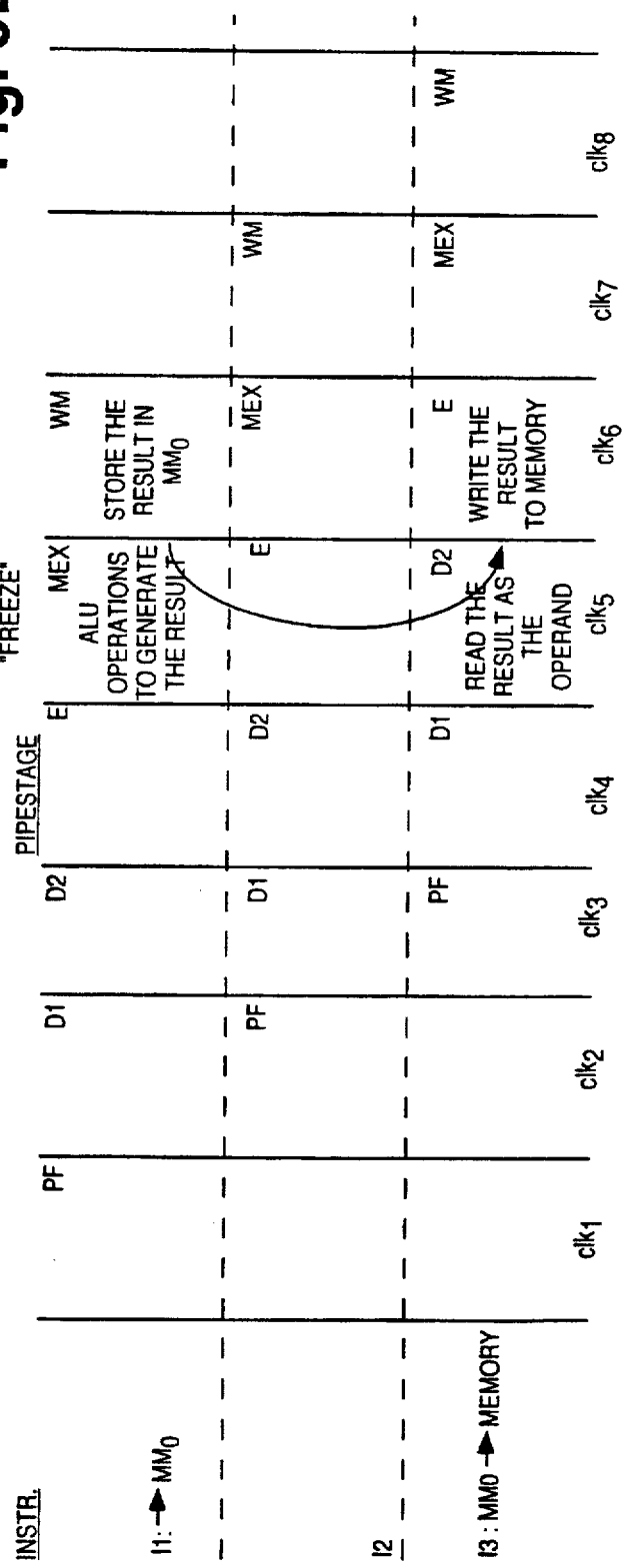
Fig. 3D
Fig. 3E

METHOD AND APPARATUS FOR PROVIDING MEMORY ACCESS IN A PROCESSOR PIPELINE

BACKGROUND OF THE INVENTION

1. Field of the Invention

The invention relates to the field of processors and microcontrollers. More particularly, the invention relates to the field of pipelining instructions.

2. Background Information

A well known way of increasing performance in processors and microcontrollers is to overlap the steps of different instructions using a technique called pipelining. To pipeline instructions, the various steps of instruction execution are performed by independent units called pipeline stages. As the number of stages is increased, while keeping the work done by the instruction constant, the processor is said to be more heavily pipelined. Each instruction progresses from stage to stage, ideally with another instruction progressing in lock step only one stage behind. Thus, there can be as many instructions in execution, as there are pipeline stages. Each stage of execution is designed to perform its work within the processor's basic machine cycle. Thus, although each instruction requires as many cycles to perform as there are pipeline stages, a pipelined processors throughput is one instruction per cycle. In this manner, pipelining reduces the average number of cycles required to execute an instruction, though not the total amount of time required to execute an instruction, by permitting the processor to handle more than one instruction at a time. Thus, pipelining is an architectural technique for improving performance over what can be achieved via processor circuit design improvements.

In addition to implementing pipelining in a processor, the processor may also be implemented as a superscaler processor. A superscaler processor is capable of executing two or more instructions in parallel under certain conditions. A good example of such a processor, is the Intel® Pentium™ Processor, manufactured by Intel Corporation of Santa Clara, Calif. The Pentium Processor is designed to execute pairs of instructions if the instructions are of a certain type and if there are no register dependencies. This is typically achieved by implementing multiple pipelines in the processor.

Typically, a pipeline includes at least one each of a fetch stage(s), a decode stage(s), an execute stage(s), and a writeback stage(s). During the fetch stage(s), one or more instructions (depending on the number of pipelines available) are accessed from a storage area, such as a code cache. During the decode stage(s), the instructions are decoded into control signals and/or microcode entry points. In the execute stage(s), the operations specified by the instructions are performed. Finally, during the writeback stage(s), the results are written to a register file. Of course, different processors may include additional stages. For example, a processor which provides for out of order execution typically also includes a retirement stage. In such a processor, the writeback stage is used for storing the results to a set of temporary registers, while the retirement stage is used for copying the results from the temporary registers into one or more architecturally visible register files. For a further description of pipelined and or superscaler microprocessors, (See, Johnson, Mike, "Superscaler Microprocessor Design," Prentice-Hall, 1991).

FIG. 1A illustrates the integer pipelines (of which there are two) of the Pentium Processor. The stages of these pipelines include a prefetch ("PF") stage 100, a first decode ("D1") stage 110, a second decode ("D2") stage 120, an execute ("E") stage 130, and a writeback ("WB") stage 140. In the PF stage 100, an instruction is retrieved from a storage area, such as a code cache. In the D1 stage 110, that instruction is decoded and control vectors are produced for the source operands. In the D2 stage 120, any operands (the term operand is used here and to refer to data operated on by the processor in response to an instruction), identified by the instruction as being stored in the integer register file are accessed (referred to herein as integer register reads). In addition, the addresses of required operands stored in memory (memory is used here to refer to storage areas outside the processor). In the E stage 130, any required memory reads or writes are performed using the addresses generated in the D2 stage 120. In addition, any required ALU operations are performed in the E stage 130. The pipe concludes with the WB stage 140. In the WB stage 140, any results generated by the execution of the instruction that must be stored in the integer register file are written (also termed as stored or placed) the integer register file.

FIG. 1A also shows a bypass 150 starting at the E stage 130, and running to the D2 stage 120. If the instruction currently in the D2 stage requires as an operand the result of the instruction currently in the E stage 130, the bypass 150 is used to deliver that result to the D2 stage. While the use of bypasses are well known in the art, the use of the bypass 150 will be further described with reference to FIG. 1C. This bypass provides the result to the D2 stage during the clock cycle of the D2 stage. As a result, this type bypass is referred to herein as an E stage to D2 stage bypass. However, since the result is provided to the D2 stage during the clock cycle of the D2 stage, the first full clock cycle for which the result is available is the clock cycle of the subsequent E stage. For this reason, this type of bypass is also termed as an E stage to E stage bypass.

FIG. 1B shows an example of the steps performed in various stages (also termed as "pipestages") of the Pentium processor integer pipeline when an integer instruction is executed that causes an operand to be copied into memory. In the example of FIG. 1B, the first instruction (designated by "I1"), is a move instruction (MOV) that causes the processor to copy the contents of integer register EAX into memory. In stage D2, the operand to be written to memory is read from integer register EAX, and the address in memory to be written to is generated. In the E stage, the operand is written to memory at the generated address.

As shown in FIG. 1B, each stage of the pipeline during the execution of the first instruction is performed in a single clock cycle (see designations $clk_i$). As a result, the second instruction shown in FIG. 1B progresses in lock step only one stage behind the first instruction. In this manner, the circuitry of the E stage is fully utilized.

FIG. 1C shows an example of the steps performed in various stages of the Pentium processor integer pipeline when an integer instruction is executed that requires both reading an operand from memory and performing ALU operations. In the example of FIG. 1C, the first instruction (designated by "I1"), is an add instruction (ADD) which causes the processor to add the contents of the integer register EAX to a value accessed from the memory and to write the result in EAX.

During the execution of the first instruction, the first operand ("Operand1") is read from the integer register EAX in the D2 stage. Upon entering the E stage, the processor reads the second operand ("Operand2") from memory. Since the reading of Operand2 from memory requires the majority of the clock cycle, there is insufficient time to perform the necessary ALU operation(s) (e.g., the add operation) during $clk_4$. As a result, the first instruction is caused to remain in the E stage for another clock cycle (e.g., $clk_5$). Thus, FIG. 1C shows the execution of the first instruction remains the E stage during $clk_4$ and $clk_5$. In the E stage during $clk_5$, the ALU operations are performed on Operand1 and Operand2 to generate the result (e.g., Operand1 is added to Operand2. At $clk_6$, the first instruction enters the write back stage and the result is written into EAX.

Since the execution of first instruction must remain in the E stage for two clocks, the second instruction (I2) cannot enter the E stage. As a result, logic is used to "freeze" or halt the second instruction in the D2 stage. In other words, the second instruction is frozen for two clocks (i.e., $clk_4$ and $clk_5$) in the D2 stage in accordance with the two clock latency associated with the first instruction. However, since the first instruction has moved on to the WB stage by $clk_6$, the second instruction enters the E stage in $clk_6$.

For purposes of illustration, it is assumed that the result of the first instruction is an operand required by the execution of the second instruction. In other words, there is a "data dependency" between the first instruction and the second instruction. In the present example, such a situation occurs where the second instruction specifies as a source operand the contents of the EAX register. Since the second instruction is dependent on the result of the first instruction, these two instructions could not be executed in parallel (one per pipeline) in a conventional machine. As a result, the decoder would be required to detect the dependency and cause the instructions to be executed serially (in the same or separate pipelines).

In addition to requiring serial execution, the data dependency between the first and second instruction also requires the second instruction not be executed until the result from the first instruction is available. Thus, the second instruction cannot enter the D2 stage (where the integer register file is read) until the result of the first instruction is generated by the E stage in $clk_5$. In order to avoid freezing the pipeline as a result of this data dependency, the result of the first instruction generated in the E stage is bypassed back to the D2 stage of the second instruction using the bypass 150. In this manner, rather than waiting for the result of the first instruction to be written in to the register file before accessing that result for the execution of the second instruction, the result is passed from the E stage to the D2 stage in $clk_5$. This avoids freezing the pipeline for such data dependencies. In the example shown in FIG. 1C, the second instruction is a move instruction that causes the processor to copy the contents of the EAX register into memory. Thus, the result is written to memory in the E stage during $clk_6$.

One limitation of the integer pipeline of the Pentium processor is that the pipeline must be stalled for one clock cycle to execute instructions which both access an operand from memory and require ALU operations to be performed. While the integer pipeline is not stalled as a result of data dependencies, it should be noted that the pipeline is stalled as shown in FIG. 1C because of the pipe structure.

FIG. 2A illustrates the floating point pipeline of the Pentium processor. This pipeline shares the first four stages with the integer pipeline shown in FIG. 1A (the PF stage 100, the D1 stage 110, the D2 stage 120, and the E stage 130). However, the floating point pipeline differs from the integer pipeline in that it continues for an additional four stages, and in that the functions performed in the D2 stage 120 and the E stage 130 are varied. Rather than accessing any register files in the D2 stage 120, the floating point pipeline performs any required floating point register file reads in the E stage 130. Also in contrast to integer pipeline, the floating point pipeline does not perform any ALU operations in E stage 130. However, similar to the integer pipeline, the floating point pipeline performs any required address generation in the D2 stage 120 and any required memory reads or writes in the E stage 130.

Following the E stage 130, the pipeline includes a first execution ("$X_1$") stage 200, a second execution ("$X_2$") stage 210, a write ("WF") stage 220, and an error ("ER") stage 230. What occurs in these stages depends on the type of instruction being executed. If the instruction being executed does not require ALU operations, but requires data be written to the floating point register file, that data is written to the floating point register file in the X1 stage 200. In contrast, if ALU operations are required, those ALU operations are performed in the X1 stage 200 and the X2 stage 210; the results of those ALU operations are written into the floating point register file during the WF stage 220; and any required control or status toward updates are performed and any errors are reported in the ER stage 230.

FIG. 2A also shows a bypass 240 running to the E stage 130 from both the X1 stage 200 and the X2 stage 210. The bypass 240 performs the same functionality performed by the bypass 150. It is worthwhile to note, that the Pentium processor implements the floating point unit using a stack architecture. Since the stack architecture of the Pentium processor is not critical to the invention, it is not further described here. For a further description of the stack architecture, see *Pentium Processor's Users Manual—Volume 3: Architecture and Programming Manual*, 1994, available from Intel Corporation of Santa Clara, Calif.

FIG. 2B shows an example of the steps performed in various styles of the Pentium processor floating point pipeline when a floating point instruction is executed that causes an operand to be copied into memory. In the example of FIG. 2B, the first instruction (designated by "I1"), is a pop instruction (POP) that causes the processor to copy the contents at the top of the floating point stack into memory. When the first instruction enters the D2 stage in $clk_3$, the memory address at which the data is to be stored is generated. During $clk_4$, the first instruction enters the E stage during which the operand is read from the floating point stack (ST). However, since a floating point memory write requires more than one clock cycle, the memory write required by the execution of the first instruction can not be completed during $clk_4$. Thus, the first instruction remains in the E stage during $clk_5$ to complete the memory write. As before, since the first instruction remains in the E stage during $clk_5$, the second instruction cannot enter the E stage. As a result, the second instruction is frozen in the D2 stage for both $clk_4$ and $clk_5$. Thus, one limitation of the floating point pipeline, is that copying data from the stack to memory requires a one clock freeze.

FIG. 2C shows an example of the steps performed in various styles of the Pentium processor floating point pipeline when a floating point instruction is executed that requires both reading an operand from memory and performing an ALU operation(s). In the example of FIG. 1C, the first instruction (designated by "I1"), is an add instruction (FADD) which causes the processor to add the contents at the top of the stack to a value stored in memory and to push the result on the stack.

During the D2 stage of the first instruction, the address of the value stored in memory is generated. During the E stage of the first instruction, the first operand ("Operand1") is read from the top of the stack and the second ("Operand2") is read from memory. During $clk_5$ and $clk_6$, the required ALU operations are performed in the X1 and X2 stages. During the WF stage of the first instruction, the result is pushed onto the stack.

Assuming there are no data dependencies between the second instruction and the first instruction, the second instruction progresses in lock step only one stage behind the first instruction as shown in FIG. 2C. However, if the result of the first instruction is not generated until the X2 stage and there is a data dependency between the second and the first instruction, the execution of the second instruction will have to be frozen in the E stage for both $clk_5$ and $clk_6$ to allow the result to be bypassed by bypass 240 from the X2 stage of the first instruction to the E stage of the second instruction. However, this pipe freeze can be easily avoided using software pipelining. Software pipelining is the technique of placing instructions between instructions that have data dependencies so that the pipeline freezes caused by data dependencies are avoided. For example, the pipeline freeze described here would be avoided if a single instruction was placed between the first instruction and the second instruction. In contrast, the pipeline freezes shown in FIGS. 1C and 2B do not result from a data dependency, and therefore, can not be removed using software pipelining.

As previously described, a limitation of the Pentium processor is that the integer pipeline must be frozen as shown in FIG. 1C and the floating point pipeline must be frozen as shown in FIG. 2B. Each time the pipelines are frozen, the performance of the processor is degraded.

SUMMARY

The invention provides a method and apparatus for providing operand reads in a processor pipeline. According to one aspect of the invention, a method is described for executing an instruction in a computer pipeline that requires different operands be read from the same register file in different stages of the computer pipeline. According to another aspect of the invention, a data path circuit is described for processing instructions in a computer pipeline. The data path circuit generally includes a register file, a first multiplexer unit, and a second multiplexer unit. The first multiplexer unit is coupled to a read port of the register file to receive data during the decode stage of the computer pipeline, while the second multiplexer unit is coupled to a different read port of the register file to receive data during the read stage of the computer pipeline. The first multiplexer unit is configured to select a first operand, while the second multiplexer unit is configured to select a second operand when necessary.

According to another aspect of the invention, a method is described for executing an instruction in a processor pipeline. According to this method, at least a first operand is read from a register file in a first stage of the processor pipeline. If execution of the instruction causes the processor to place the first operand in a storage area other than the register file, then the first operand in written to that storage area in a subsequent stage of the processor pipeline. Otherwise, one or more ALU operations are performed on the first operand and at least a second operand in a different subsequent stage of the processor pipeline.

BRIEF DESCRIPTION OF THE DRAWINGS

The invention may best be understood by referring to the following description and accompanying drawings which illustrate the invention. In the drawings:

FIG. 1A illustrates the integer pipelines (of which there are two) of the Pentium Processor.

FIG. 1B shows an example of the steps performed in various stages of the Pentium processor integer pipeline when an integer instruction is executed that causes an operand to be copied into memory.

FIG. 2B shows an example of the steps performed in various styles of the Pentium processor floating point pipeline when a floating point instruction is executed that causes an operand to be copied into memory.

FIG. 2C shows an example of the steps performed in various styles of the Pentium processor floating point pipeline when a floating point instruction is executed that requires both reading an operand from memory and performing an ALU operation(s).

FIG. 3D illustrates the situation in which a pipeline in accordance with one embodiment of the invention must be frozen.

FIG. 3E illustrates how software pipelining can be used to avoid the pipeline freeze shown in FIG. 3D.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus for providing operand reads in a processor pipeline is described. In one embodiment, different stages of a processor pipeline are implemented to read operands from the same register file. In the same embodiment or in a different embodiment, separate stages of a processor pipeline are implemented for 1) reading at least one operand; 2) performing any required memory writes; and 3) performing any required ALU operations. While the invention may be used for any number of purposes, it is described with reference to implementing a pipeline that, in most situations, need not be frozen to write data from a register file to memory (as compared to FIG. 2B), or to execute an instruction that requires accessing an operand from memory and performing ALU operations (as compared to FIG. 1C). Thus, while the invention is described with reference to memory accesses, it is understood that this description does not limit the scope of the invention as the invention may be used for any number of purposes. In one embodiment of the invention that is compatible with the Pentium processor, one operand is read from a register file in the D2 stage, any required memory writes are performed in the E stage, and any required ALU operations are performed in a third stage.

The processor upon which the present invention may be implemented is compatible with the Intel architecture for microprocessors. Specifically, the processor contemplated for the use with the present invention includes a U-pipeline and V-pipeline, so that the machine is capable of executing two instructions in parallel. In one embodiment, the U- and V-pipelines are capable of operating as the integer pipeline shown in FIG. 1A, while only the U-pipeline is capable of operating as the floating point pipeline shown in FIG. 2A. Of course, the invention described herein is not limited to the Intel architecture for processors and could be implemented on any number of processor architecture's.

Figure 3A:
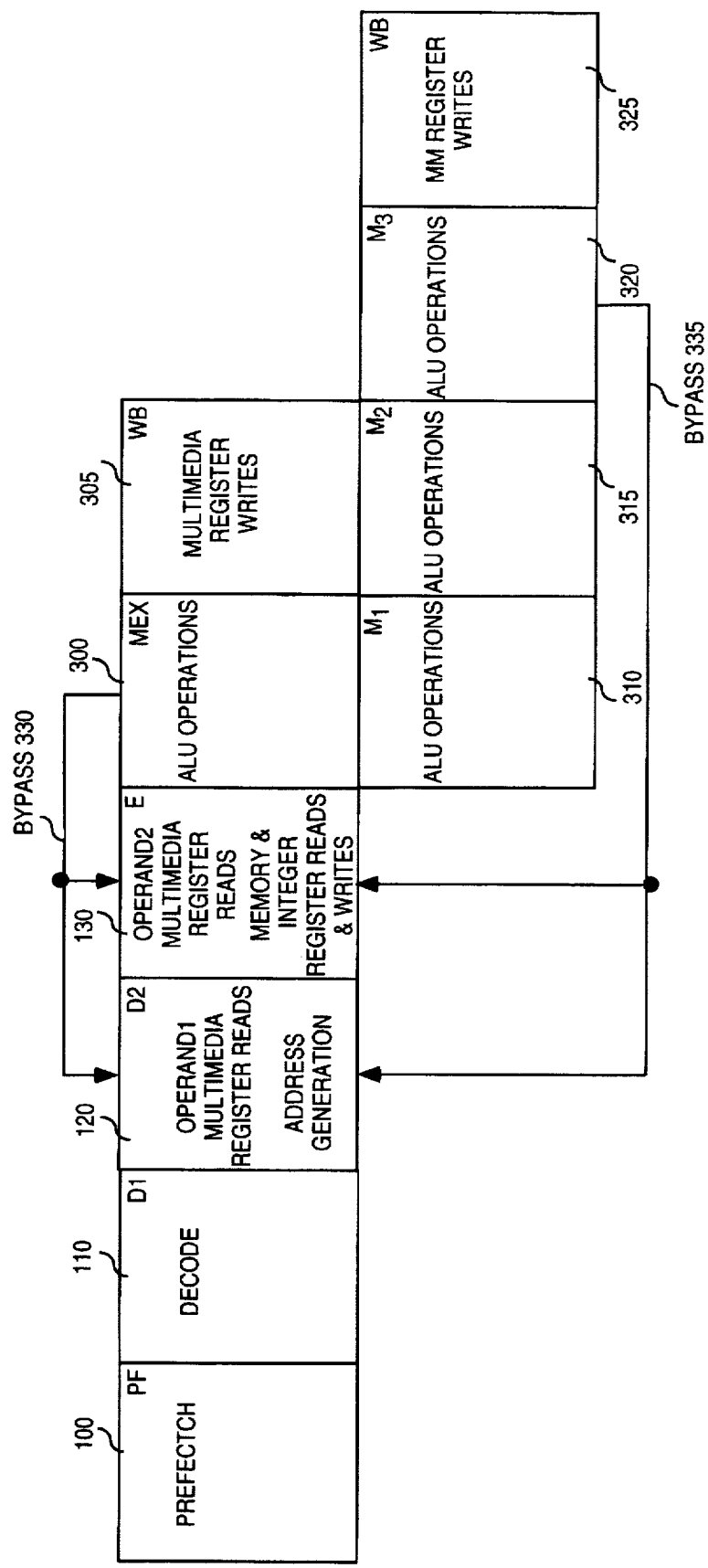
FIG. 3A shows steps performed in the stages of a pipeline in accordance with one embodiment of the invention.

FIG. 3A shows steps performed in the stages of a pipeline in accordance with one embodiment of the invention. In the described embodiment, this pipeline is incorporated into the Intel architecture for executing instructions to operate on pack data. The idea of pack data is well known in the art. Although any number of pack data instruction could be implemented, one embodiment implements the set of instructions described in "A Set of Instructions for Operating on Packed Data," filed on Aug. 31, 1995, Ser. No. 08/521, 360. Thus, the pipeline shown in FIG. 3A is referred to herein as the multimedia pipeline. Although the description which follows is specific to a class of instructions designed for processing multimedia data, practitioners in the art world appreciate that the apparatus and method utilized these embodiments is applicable to a wide variety of specialized, as well as, general purpose, computers. In other words, pipeline computer systems of virtually any type will find the present invention advantageous.

In order to save die space and hardware complexity, the multimedia pipeline shares the first four stages with the integer and floating point pipelines (the PF stage 100, the D1 stage 110, the D2 stage 120, and the E stage 130). In one embodiment, the multimedia pipeline differs from both the integer and floating pipelines, in that Operand1 is read from a multimedia register file in the D2 stage 120, but Operand2, if required and if stored in the multimedia register file, is not read until the E stage 130. Thus, when both operands must be read from the multimedia register file, they are read in separate stages. As will be further described later, Operand2 is not read until the E stage 130 to reduce the bypass hardware complexity. Similar to both the integer and floating point pipelines, any required address generation is performed in the D2 stage 120. Similar to the integer pipeline but different from the floating point pipeline, Operand1 (if required) is read from the multimedia register file in the D2 stage 120. Similar to both the integer and floating pipelines, any required memory reads or writes are performed in the E stage 130. Similar to the floating point pipeline but different from the integer pipeline, the multimedia pipeline reads Operand2 (if required) from the multimedia register file in the E stage 130. Similar to the floating point pipeline but different from the integer pipeline, the ALU operations are performed in a stage separate from the E stage.

The stages following the E stage 130 in that multimedia pipeline depends upon the instruction executed. If the instruction is not a multiply instruction, the E stage 130 is followed by a multimedia execution ("MEX") stage 300 and a writeback multimedia ("WM") stage 305. Any required ALU operations are performed in the MEX stage 300, while any required multimedia register file writes are performed in the WB stage 305. In contrast, if the instruction requires multiplication, the E stage 130 is followed by a first multimedia execution ("$M_1$") stage, a second multimedia execution ("$M_2$") stage 315, a third multimedia ("$M_3$") stage 320, and a writeback multimedia ("WM") stage 325. The required multiplication operations are performed in the $M_1$, $M_2$, and $M_3$ stages, while the result of this multiplication is written in to the multimedia registers in the WM stage 325.

FIG. 3A also shows a bypass 330 and a bypass 335. The bypass 330 runs from the MEX stage 300 to both the D2 stage 120 and the E stage 130. In contrast, the bypass 335 runs from the $M_3$ stage 320 to both the D2 stage 120 and the E stage 130. The bypasses run to both the D2 and E stages because operands are selected in both stages. The bypasses 330 and 335 perform the same functionality as the bypass 150 from FIG. 1A and bypass 240 from FIG. 2A. The bypasses running from the MEX and $M_3$ stages to the D2 stage provide the results to the D2 stage during the clock cycle of the D2 stage, while the bypasses running from the MEX and $M_3$ stages to the E stage provide the results to the E stage during the clock cycle of the E stage. The bypasses to the D2 stage are referred to herein as an MEX stage to D2 stage bypass and an $M_3$ stage to D2 stage bypass. Similarly, the bypasses to the E stage are referred to herein as an MEX stage to E stage bypass and an $M_3$ stage to E stage bypass. However, since the bypasses provide the results to the D2 and E stages during the cycle cycles of those stages, the bypass 330 is also termed as an MEX stage to E stage bypass and an MEX stage to MEX/M1 stage bypass, while the bypass 335 is also termed as an M3 stage to E stage bypass and an M3 stage to MEX/M1 stage bypass.

In one embodiment, only one pipe (e.g., the U-pipe) is implemented to allow data to be written and read from storage areas other than the multimedia register file (e.g., the integer register file, the external memory, ETC.). That is, only one pipeline is implemented as shown in FIG. 3A. Thus, the V-pipeline does not allow for memory and integer register reads and writes during any stage. In addition, in order to save on hardware complexity, the V-pipeline is implemented such that both Operand1 and Operand2 are read from the multimedia registers in the E stage 130. Thus, a mechanism is included to route those multimedia instructions that require accesses to storage areas other than the multimedia register file to the U-pipeline. Of course, alternative embodiments could implement both pipelines to allow for access to the integer register file and/or the external memory. In addition, alternative embodiments could be implemented to include more or less pipelines. Furthermore, the invention only requires: 1) if any operands are required that are or will be stored by a previous instruction in the multimedia register file, that at least one of those operands is read in the D2 stage 120; 2) that any memory writes be performed in the E stage 130; and 3) that any required ALU operations are performed in stages other than the D2 stage 120 and the E stage 130. However, alternative embodiments could be implemented to read as many operands (from either the multimedia register file or other storage area) as desired in the D2 stage 120, rather than reading only one operand.

Figure 2A:
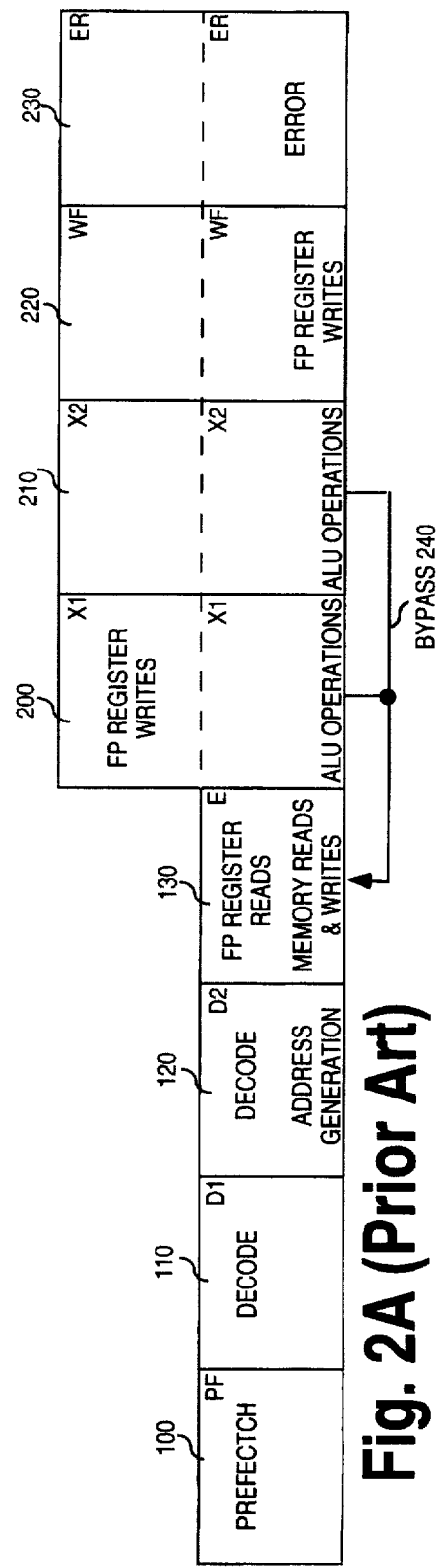
FIG. 2A illustrates the floating point pipeline of the Pentium processor.
Figure 3B:
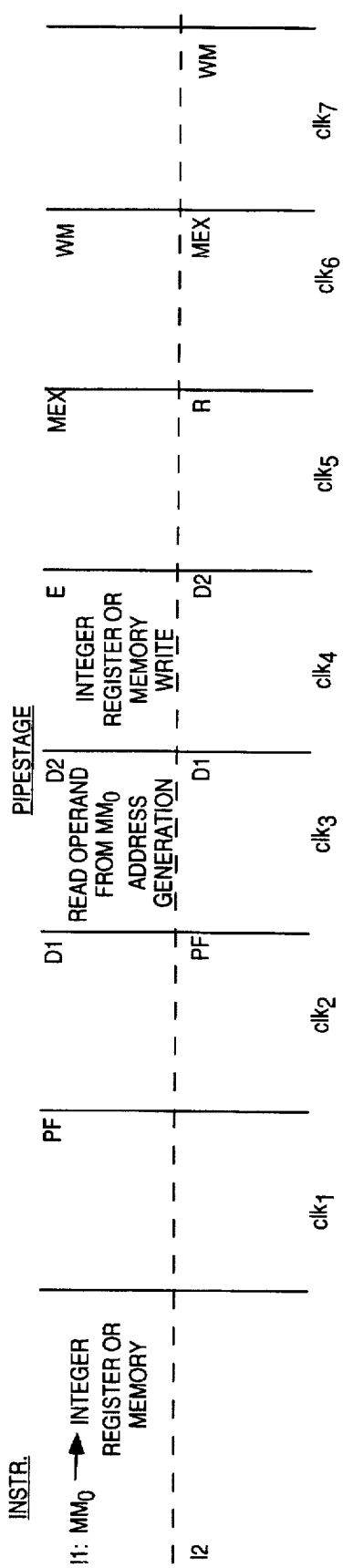
FIG. 3B illustrates steps performed in various pipeline stages for the execution of an instruction which copies the contents of a register to memory according to one embodiment of the invention.

FIG. 3B illustrates steps performed in various pipeline stages for the execution of an instruction which copies the contents of a register to memory according to one embodiment of the invention. In the example of FIG. 3B, the first instruction (designated by "I1"), is a move instruction (MOVQ or MOVD) that causes the processor to copy the contents of integer register $MM_0$ into memory or the integer register file. During the D2 stage of the first instruction, the operand is read from register $MM_0$. If the data is to be written to memory, the address in that memory is also generated in the D2 stage. In contrast, if the data is to be written to the integer register file, the integer register is identified in the D2 stage. In the E stage of the first instruction, the operand is written to memory. Since the operand was accessed from the multimedia registers in a stage separate from the stage in which the operand is written, the pipeline need not be stalled as in the D2 stage of the floating point pipeline (compare FIGS. 2B and 3B). Thus, the execution of the second instruction occurs in lock step only one step behind the first instruction as shown in FIG. 3B.

Figure 3C:
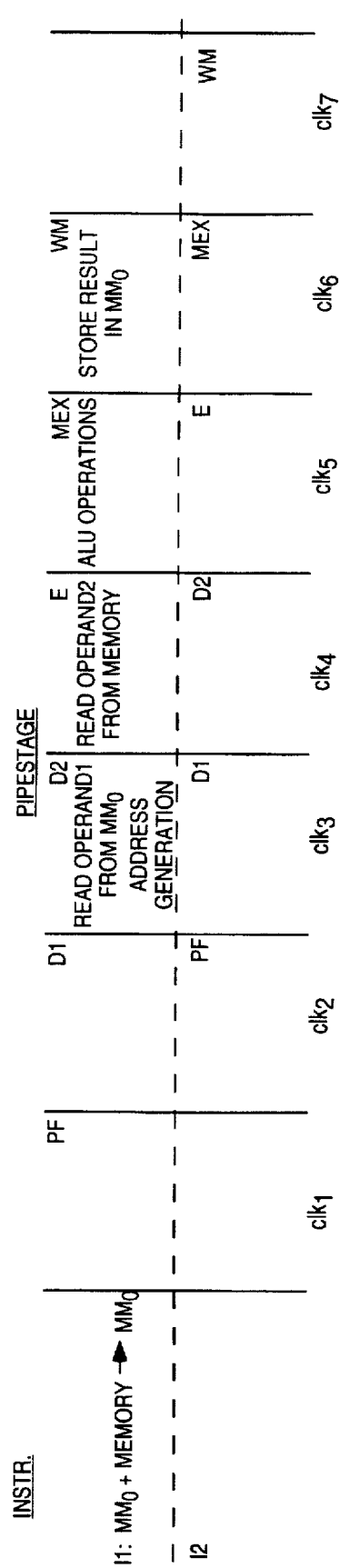
FIG. 3C illustrates steps performed in various pipeline stages for the execution of an instruction that requires both accessing an operand from memory or the integer register file and performing ALU operations according to one embodiment of the invention.

FIG. 3C illustrates steps performed in various pipeline stages for the execution of an instruction that requires both accessing an operand from memory or the integer register file and performing ALU operations according to one embodiment of the invention.

In the example of FIG. 3C, the first instruction (designated by "I1"), is an add instruction (PADD) that causes the processor to add the contents of register $MM_0$ and a value stored in memory and to write the result to $MM_0$. During the D2 stage of the first instruction, Operand1 is read from $MM_0$ and the address in memory is generated. During the E stage, Operand2 is read from memory. The necessary ALU operations to add Operand1 and Operand2 are performed in the MEX stage. Finally, the result is stored in the register $MM_0$ during the WM stage.

Figure 1C:
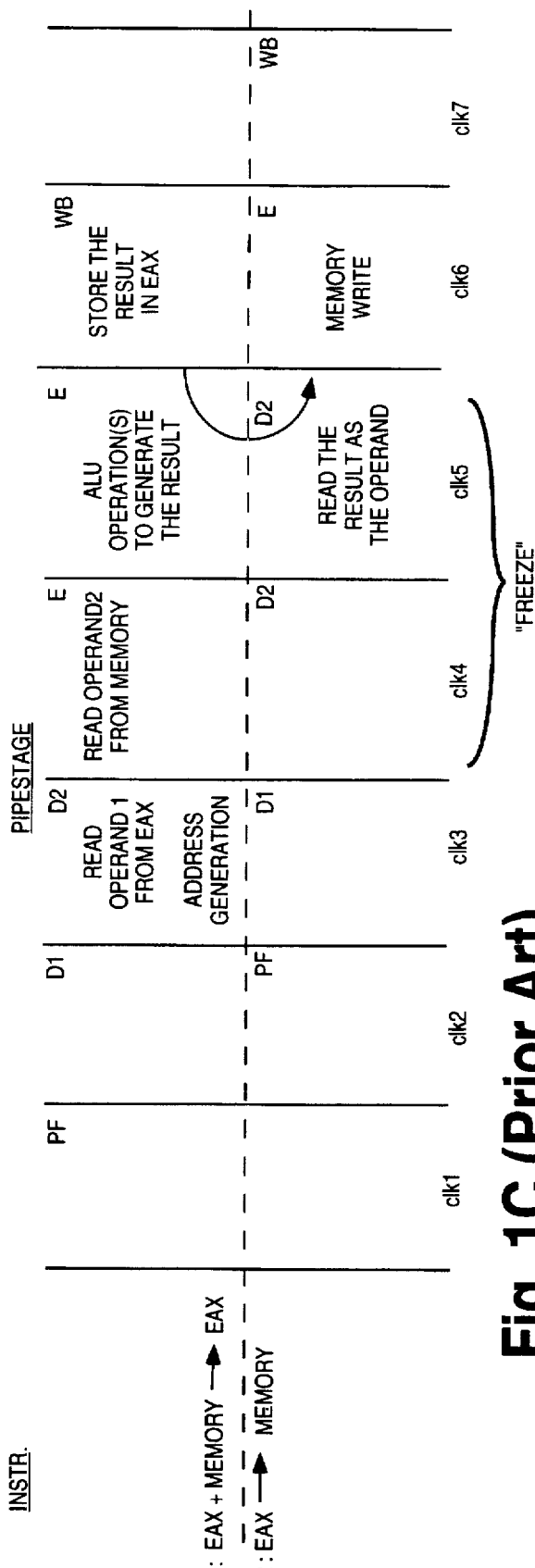
FIG. 1C shows an example of the steps performed in various stages of the Pentium processor integer pipeline when an integer instruction is executed that requires both reading an operand from memory and performing ALU operations.

In the example shown in FIG. 3C, the second instruction is not one which requires the result of the first instruction to be written to memory. As a result, the second instruction progresses in lock step through the stages of the pipeline only one stage behind the first instruction. As a result, the pipeline does not have to be stalled as it did in the integer pipeline as shown in FIG. 1C. That is, since the ALU operations are performed in a stage separate from the stage in which Operand2 is read from memory, the pipeline need not be frozen as in the D2 stage of the integer pipeline (compare FIGS. 1C and 3C). As a result, processor throughput is increased.

FIG. 3D illustrates the situation in which a pipeline, in accordance with one embodiment of the invention, must be frozen. The first instruction is one which requires ALU operations to be performed to generate a result. Thus, in the MEX stage of instruction 1, these ALU operations are performed to generate the result. In the WM stage of the first instruction, that result is stored in $MM_0$.

In the example shown in FIG. 3D, the second instruction is one which requires the contents of $MM_0$ (i.e., the result of the execution of the preceding instruction) to be stored in the memory. Thus, there is a data dependency between the first and second instructions. As a result, these two instructions cannot be executed in parallel (one per pipeline). Therefore, the decoder and/or compiler must be implemented to detect the dependency and cause the instructions to be executed serially (in the same or different pipelines). In an embodiment in which only the U-pipeline is capable of accesses to memory and the integer registers, the second instruction is executed on the U-pipeline, while the first instruction is executed on either the U- or V-pipelines.

Since the result of the first instruction is not available until the MEX stage is performed during $clk_5$, the result cannot be passed as an operand to the second instruction until $clk_5$. As a result, the second instruction can not progress from the D2 stage to the E stage until the result is available. Thus, the pipeline is stalled and the second instruction is kept in the D2 stage during both $clk_4$ and $clk_5$. When the result is available during $clk_5$, the result is passed from the MEX stage of the first instruction to the E stage of the second instruction using bypass 330 from FIG. 3A. Following the D2 stage, the second instruction enters the E stage on $clk_6$ and the operand is written to memory.

Although the situation described in FIG. 3D requires a pipeline freeze, this situation can easily avoided using software pipelining. Software pipelining is the technique of placing instructions in an order such that pipeline freezes are avoided. The pipeline freeze shown in FIG. 3D would be avoided if a single instruction was placed between the first instruction and the second instruction as shown in FIG. 3E. Software pipelining can be used because the pipeline freeze shown in FIG. 3D results from a data dependency. In contrast, the pipeline freezes shown in FIGS. 1C and 2B do not result from a data dependency, and therefore, can not be removed using software pipelining.

While the instructions described above are not multimedia multiply instructions, the same concepts apply to the execution of such instructions. However, since the execution of the multiply instructions require additional stages as shown in FIG. 3A, additional freezes are required unless software pipelining is used to avoid such freezes.

Figure 4A:
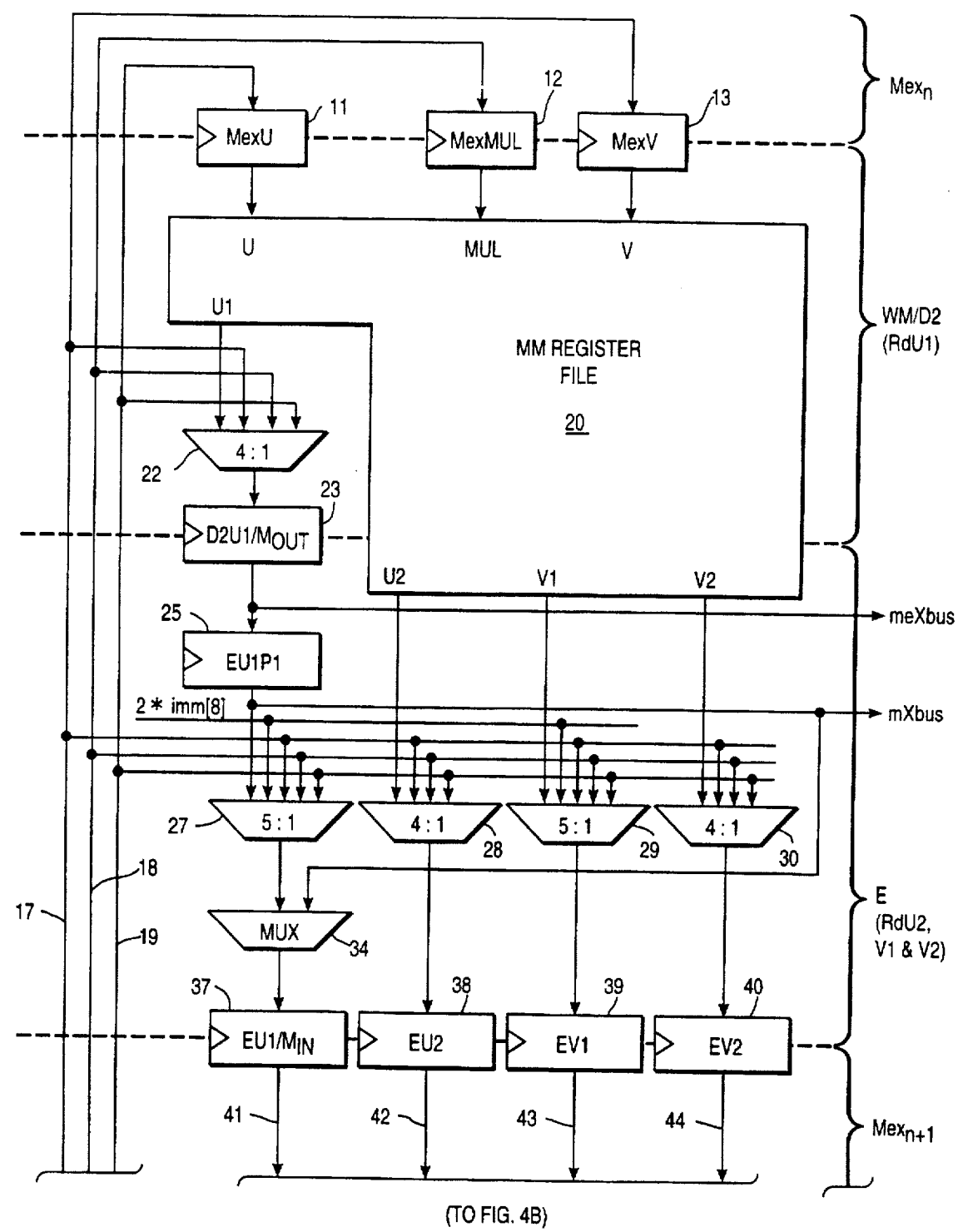
FIGS. 4A and 4B are a circuit schematic diagram of the multimedia data path according to one embodiment of the present invention.
Figure 4B:
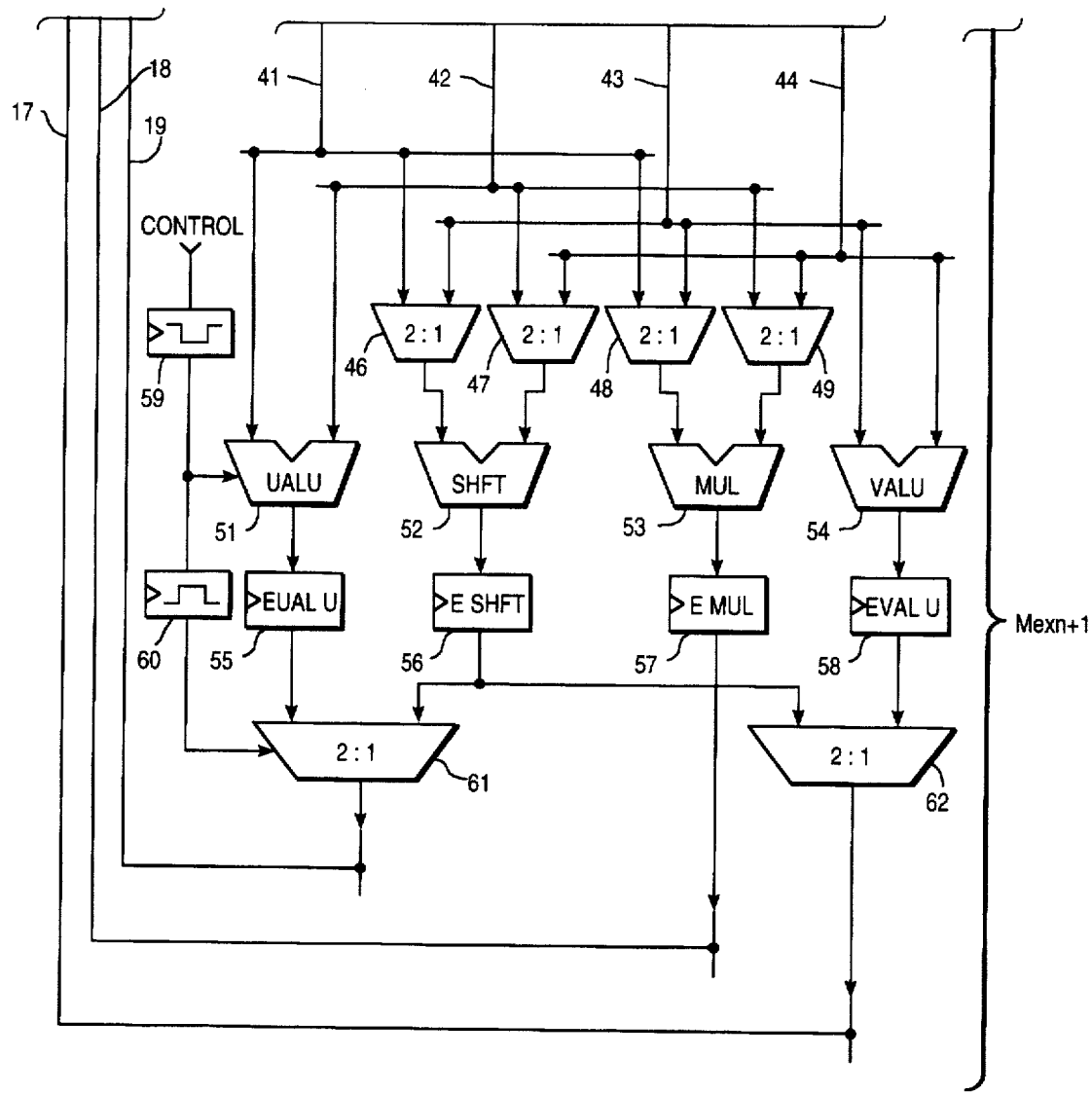

FIGS. 4A and 4B are a circuit schematic diagram of the multimedia data path according to one embodiment of the present invention. The data path shown does not include the PF or D1 stages, as they are not necessary to understanding the invention.

In the embodiment shown, for all multimedia operations (except for multiply) the data path functions in the D2, E, Mex, and WM pipestages. Notations for these pipestages are shown in FIGS. 4A & 4B along the right hand vertical side of the circuit schematic diagram. Note that the Mex stage is given a subscript notation to indicate the pipeline sequence (i.e., n, n+1).

The multimedia data path shown in FIGS. 4A & 4B comprises several functional unit blocks. These data path functional unit blocks carry out all the data manipulation needed for execution of multimedia instructions in the implementation described. For example, a register file functional unit block includes the multimedia register file 20 and the D2 stage bypass multiplexer 22. Together these blocks manipulate three result buses (i.e., U, MUL, and V) and four operand buses (i.e., U1, U2, V1, and V2) simultaneously.

In one implementation, the multimedia register file 20 contains eight registers ($MM_0$–$MM_7$). Each register is 64-bits wide. The register file can be read via the four read ports; U1, U2, V1, and V2. The U1 port is used to read the first source operand (SRC1) for the U-pipeline. The U2 read port is used to read the second source operand (SRC2) for the U-pipeline. Similarly, the V1 and V2 ports correspond to the V pipeline. During a given clock cycle, any multimedia register can be read via any one of the read ports. Furthermore, any register can be read at any number of read ports simultaneously. Note that since in each clock there can be either zero, one, or two vectors running, there may be either 0, 2, or 4 read ports active at any time. The actual reading of the data takes in the second phase (PH2) of the clock cycle. Any access to register file 20, either read or write, is to the entire 64 bits of the registers. In other words, partial reads and writes are not allowed in the embodiment described.

As shown in FIG. 4A, SCR1 for the U-pipeline is read in the D2 stage, while the remaining operands (SCR2) for the U-pipeline and both operands for the V-pipeline) are read in the E stage. As previously described with reference to FIG. 3B, reading at least one operand in the D2 allows integer register or memory writes to occur without a pipeline freeze if proper software pipelining is used.

The 4:1 multiplexer 22 multiplexes the U1 read port output with the three meX result buses 17–19 for store bypassing. The output of multiplexer 22 constitutes the fourth output bus of the register file functional unit block in the implementation shown. Thus, in the D2 stage, which also corresponds to the WM stage of the preceding operation, the U1 register port is read and result is optionally bypassed from the $Mex_n$ stage.

There are two types of bypass multiplexers used in this embodiment: one type for EU1 and EV1 (having five inputs, including an immediate) and another type for D2U1, EU2, and EV2 (having four inputs to the multiplexer, with no immediate). The first type of multiplexer is shown as multiplexer 27 or 29 in FIG. 4A, whereas the second type consists of multiplexer 22, 28, or 30. The four-input multiplexer type includes one input for the register file 20, one input for the bypass from the multiplier, and one input each from the U-pipe and V-pipe result buses.

The immediate is a straightforward case for controlling the multiplexer because the source that has an immediate is compared to a destination that cannot have an immediate; thus, the collision detect comparison always fails, and the bypass is never enabled. This is guaranteed by design in a current implementation of the invention. Therefore selecting an immediate in this multiplexer only requires that the immediate be decoded from the respective source field. The three bypass inputs are selected if there is a collision reported for that multiplexer and the destination vector that caused the collision is a valid vector. Practitioners in the art should understand that the actual bypass and source data multiplexers are constructed as contention multiplexers, i.e., as a tristate bus. Thus, care should be taken to ensure that the enables of the multiplexers are mutually exclusive, and that the output of the multiplexer is always driven.

The logic elements below the multimedia register file 20 and multiplexer 22—until the time the data enters the arithmetic logic units, shifter and multiplier—comprise the multimedia multiplexer functional unit block. It is this functional unit block that handles the bypassing, operand selection, and bus driving. Accordingly, it comprises multiplexers, latches, and bus drivers.

The multiplexing functional unit block contains the D2U1/$M_{OUT}$ latch 23, the EU1P1 latch 25, the mX bus and meX bus drivers, the four E stage bypass multiplexers 27–30, the four E stage output latches 37–40 and the four 2:1 Mex operand selection multiplexers 46–49. The multiplexer functional unit block functions in the D2, E, and Mex pipestages. For example, in the second phase of the D2 pipestage, an operand is provided at the output of multiplexer 22 which is then latched into the D2U1/$M_{OUT}$ latch 23, which is a PH2 latch. This latch version is used for E stage data manipulation.

In accordance with the embodiment shown the multimedia data path interfaces with the meX bus in order to read and write data to and from the data cache and integer resources of the processor. In addition, the meX bus is utilized to perform write operations to the cache memory.

In the E stage, the remainder of the read ports are read. This includes ports U2, V1, and V2. Then, the source operands for the U and V-pipelines are selected. For all sources the operand buses from the register file functional unit block (that are valid at the beginning of the second phase of the E stage clock) are multiplexed with the three result buses that are valid at the same time. In this manner, the values read from the register file 20 are multiplexed with results from bypassing. These multiplexers are shown in FIG. 4A as multiplexers 27–30, whereas the result buses are indicated as buses 17, 18, and 19 in FIGS. 4A & 4B. If necessary, the mX bus and the meX bus are also driven in the E stage for MOV vectors. Multiplexer 34 is utilized to select between the data on the mX bus and the output of multiplexer 27. The data is latched in these E stage multiplexers. The multiplexer outputs are then latched in the E stage output latches 37–40 for Mex stage usage.

For SRC1 from both the U- and V-pipelines, an additional input to the multiplexer is an immediate value (indicated as 2*imm[8]) that is used for shift counts. The actual width of the immediate data is 8 bits and therefore only these bits are 5:1 multiplexed. The rest of the bits in the V1 path are multiplexed by a 4:1 multiplexer.

As discussed earlier, the U1 operand is latched in the D2U1/$M_{OUT}$ latch 23, and is valid at the beginning of the E stage clock. The D2U1/$M_{OUT}$ latch 23 is latched in the PH1 phase. The EU1P1 latch 25 latches at the following edge of the E stage clock. The operand path from there through the 5:1 multiplexer 27 to the E stage output latch (the output line 41 of latch 37) is similar to the V-pipeline SRC1 operand path which has an output latched on line 43 via latch 39.

For MOV (store) vectors, the data is driven onto either the meX bus or the mX bus. In order to preserve the E stage data during an E stage freeze, D2U1/$M_{OUT}$ latch 23 is an enabled latch. This means that D2U1/$M_{OUT}$ latch 23 latches the data only if there is no freeze in effect during a current clock. In order to minimize loading impact on the freeze signal, a buffered version of the freeze signal is used as an enable for the D2U1/$M_{OUT}$ latch 23.

For MOV (load) vectors, data is latched from the mX bus into a latch 37 via multiplexer 34. In other words, 2:1 multiplexer 34 selects between the mX bus input and the U1 operand input. From thereon, the data of the EU1/$M_{IN}$ latch 37 propagates the Mex stage the same as the other operands.

The eight meX operand buses, shown in FIG. 4B as 41–44 and the outputs of multiplexers 46–49, constitute the outputs of the multiplexer functional unit block. These operand buses are coupled directly to the shifter ALU and multiplier functional units.

The multiplexer functional unit block also works in the Mex pipestage to select the proper operands for shifter 52 and multiplier 53. The decision is based on whether the shift/multiply vectors have been issued to the U and the V-pipelines. As can be seen in FIG. 4B, two ALUs 51 and 54 are coupled directly to the U and V-pipelines, respectively; therefore, no selection is required.

The U-pipeline arithmetic logic unit (UALU) 51, V-pipeline arithmetic logic unit (VALU) 54, shifter (SHFT) 52, and multiplier (MUL) 53 are the functional unit blocks that carry out the actual computations in the Mex stage. Each of these functional unit blocks is coupled to two source buses. The result is generated in less than half of a clock cycle.

In the Mex pipestage, the multimedia execution units compute the results in the first phase of the clock cycle, i.e., PH1. As shown in FIG. 4B, the input to multiplier 53 and shifter 52 is multiplexed through 2:1 multiplexers 46–49 in order to allow issuing of these instructions in the U and V-pipelines. The latter results are provided to the multiplexers via lines 41–44. The multimedia multiply (MUL)

instruction is executed in the M1, M2, and first phase (PH1) of the M3 pipestages, as previously discussed. The outputs of these functional unit blocks are output onto the three result buses shown in FIGS. 4A & 4B as buses 17, 18, and 19. Multiplexing onto these buses occurs via multiplexer 61 and 62, which received their inputs via latches 55–58.

Prior to entering shifter 52 and multiplier 53, data is multiplexed through respective multiplexers 46 & 47 (for shifter 52) and 48 & 49 (for multiplier 53). The purpose of these multiplexers is select the source operands from either the U-pipeline or the V-pipeline. Logically, all that is required is to determine whether one of the pipelines has its valid bit set, and also that its opcode group indicates a multiply/shift operation. The calculation for this quantity is performed in the E stage and then delayed using an enabled transparent latch (e.g., latches 37–40). The control signal for shifter 52 and the output multiplexer in the U-pipeline are shown being provided in FIG. 4B through latches 59 and 60.

Thus, the pipelines shown in FIG. 4A–B perform any required ALU operations in a separate stage from the memory and register file reads. In this manner, instructions that require both memory reads and ALU operations do not require a pipeline freeze (See FIG. 3C as contrasted with FIG. 1C).

In the WM pipestage the multimedia register file 20 is updated (see FIG. 4A). Because it might be the case that the reading and writing of the register file overlaps, the register file is provided with a write-through capability in accordance with the present invention.

The register file 20 is provided with inputs from the three meX result buses 17–19 which are latched into the three input latches 11–13, respectively. The latched versions provide the inputs to the three register file write ports; U, MUL, and V, respectively. The U write port is used to write the U-pipeline results to register file 20. Likewise, the V write port is used to write the V-pipeline results. The MUL write port is used for writing the multimedia multiplier results back to the register file. At each clock up to three write ports can write simultaneously to three different registers. A single multimedia register, however, can be written via only one write port at any given clock, with the actual writing taking place in the first phase of the clock cycle.

Register file 20 is implemented as a write-through register file. This takes care of the situation in which a multimedia vector in the WM pipestage writes to a register which is read by a subsequent (e.g., next clock) multimedia vector in either the D2 or the E pipestages. Stated another way, this means that the register file has a read-modify-write capability. Therefore, new values written to a register in a first phase of a clock, can be read in the second phase of the same clock.

In the above described embodiment, only one operand is read in the D2 stage. As a result, the bypass circuitry needed only to be duplicated for one operand (e.g., multiplexer 22, D2U1/$M_{OUT}$ latch 23, EU1P1 latch 25). However, alternative embodiments could be implemented in any number of ways. For example, one alternative embodiment could read more that one operand in the D2 stage. Another alternative embodiment could read all operands in the D2 stage and none in the E stage.

In addition, in the above described embodiment, two pipelines were implemented, each of which uses two operands. Alternative embodiments could implement more or less pipelines. In addition, alternative embodiment could implement pipelines that operated on more or less operands. Furthermore, alternative embodiments could implement pipelines with more or less stages.

Furthermore, in the above described embodiment, only one pipeline (the U-pipeline) is capable of executing instructions that access the integer registers or memory. In this manner, circuitry complexity is saved. Alternative embodiments could be implemented such that more pipelines are capable of this functionality.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method for executing an instruction in a processor pipeline, said method comprising the steps of:

A) reading at least a first operand of said instruction from a first register file in a first stage of said processor pipeline;

B) if said instruction specifies a storage area other than said first register file in which said first operand is to be placed, placing said first operand in said storage area in a second stage of said processor pipeline;

C) otherwise, performing at least part of one or more ALU operations on said first operand and at least a second operand of said instruction in a third stage of said processor pipeline, said ALU operations generating a result.

2. The method of claim 1, further comprising the steps of:

D) providing said result to both said first stage and said second stage.

3. The method of claim 1, wherein said step of performing one or more ALU operations further includes the step of performing one or more packed data operations.

4. The method of claim 1, further comprising the steps of:

D) writing said result into said first register file in a fourth stage.

5. The method of claim 1, further comprising the steps of wherein:

D) if said instruction did not cause said processor to place said first operand in said storage area, then reading at least said second operand in said second stage.

6. The method of claim 5, wherein said step of reading said second operand in said second stage further includes the step of reading said second operand from either said first register file, a memory, or a second register file.

7. A method for executing instructions in a processor including at least a first pipeline and a second pipeline having corresponding first, second, third and fourth stages, said method comprising the steps of:

in said first pipeline, execution of a first instruction including the steps of:
       reading at least a first operand from a register file in said first stage of said first pipeline; and
       reading at least a second operand from said register file in said second stage of said first pipeline,
   in said second pipeline, execution of a second instruction including the steps of:
       reading at least a third operand and a fourth operand from said register file in said second stage of said second pipeline.

8. The method of claim 7, further comprising the step of:

in said first pipeline, execution of said first instruction also including the step of:
       performing at least part of one or more ALU operations on at least said first and second operands in said third stage of said first pipeline, said ALU operations generating a first result; and in said second pipeline, execution of said second instruction also including the step of:
performing at least part of one or more ALU operations on at least said third and fourth operands in said third stage of said second pipeline, said ALU operations generating a second result.

9. The method of claim 8, further comprising the steps of:
in said first pipeline, execution of said first instruction also including the step of:
providing said first result to both said first stage and said second stage of said first pipeline; and in said second pipeline, execution of said second instruction also including the step of:
providing said second result to said second stage of said second pipeline.

10. A method for executing instructions in a processor including at least a first pipeline and a second pipeline having corresponding first, second, third, and fourth stages, said method comprising the steps of:
in said first pipeline, execution of a first instruction including the steps of:
reading at least a first operand from a first register file in said first stage of said first pipeline;
if said first instruction causes said processor to place said first operand in a storage area other than said first register file, placing said first operand in said storage area in said second stage of said first pipeline;
otherwise, performing at least part of one or more ALU operations on said first operand and at least a second operand in said third stage of said first pipeline, said ALU operations generating a first result; and in said second pipeline, execution of a second instruction including the steps of:
reading at least a third and fourth operands from said first register file in said second stage of said second pipeline; and
performing at least part of one or more ALU operations on at least said third and fourth operands said third stage of said second pipeline, said ALU operations generating a second result.

11. The method of claim 10, further comprising the steps of:
in said first pipeline, execution of a subsequent instruction that specifies said first result as a source operand including the steps of:
providing said first result to the first stage of said subsequent instruction.

12. The method of claim 10, further comprising the step of:
in said first pipeline, execution of said first instruction also including the step of:
if said first instruction did not cause said processor to place said first operand in said storage area, then reading at least said second operand in said second stage.

13. The method of claim 10, wherein said step of reading at least said second operand in said second stage further includes the step of reading said second operand from either said first register file, a memory, or a second register file.

14. The method of claim 10, further comprising the steps of:
in said first pipeline, performing the additional step of writing said first result into said first register file in said fourth stage of said first pipeline; and in said second pipeline, performing the additional step of writing said second result into said first register file in said fourth stage of said second pipeline.

15. The method of claim 10, further comprising the steps of:
in said first pipeline, performing the additional step of providing said first result to both said first stage and said second stage of said first pipeline; and in said second pipeline, performing the additional step of providing said second result to said second stage of said second pipeline.

16. A data path circuit for processing instructions in a pipelined processor, the data path circuit comprising:
a register file having a plurality of read ports;
a first multiplexer unit, coupled to a first of said plurality of read ports, configured to select a first operand, said first multiplexer unit receiving data from said register file during a decode stage of a first pipeline;
a second multiplexer unit, coupled to a second of said plurality of read ports, configured to select a second operand, said second multiplexer unit receiving data from said register file during a read stage of said first pipeline when necessary;
a set of one or more result buses coupled to said first multiplexer unit to provide for a first and second bypass, said first multiplexer unit retrieving results from said first bypass during said decode stage and from said second bypass during said read stage, said register file having one or more write ports coupled to corresponding ones of the set of one or more result buses; and
a functional unit coupled to receive the first and second operands, the functional unit executing, during an execute stage of said first pipeline, operations specified by one or more instructions, results of the operations being provided on the one or more result buses.

17. The data path circuit of claim 16, further comprising:
an operand bus, coupled to said first multiplexer unit, transmitting, during the read stage of said first pipeline, operands to be written to storage areas other than said register file.

18. The data path circuit of claim 16, further comprising:
a third and fourth multiplexer units respectively coupled to a third and fourth of said plurality of read ports, configured to respectively select a third and fourth operand, said third and fourth multiplexer units receiving data from said register file during said read stage of a second pipeline.

19. The data path circuit of claim 16, wherein said first multiplexer unit includes a first multiplexer and a second multiplexer, said first multiplexer coupled to said first of said plurality of read ports and said set of one or more result buses, said second multiplexer coupled to the one or more result busses and coupled to receive the output of said first multiplexer.

20. The data path circuit of claim 19, wherein said second multiplexer unit is coupled to said one or more result buses to provide a third bypass, said second multiplexer unit retrieving results from said third bypass during said read stage.

21. A data path circuit for processing instructions in one or more pipelines that include decode, read, execute, and write stages, the data path circuit comprising:
a plurality of result buses;
a register file having a plurality of write ports coupled to corresponding ones of the plurality of result buses, the register file also having a plurality of read ports;

a multiplexer means coupled to the plurality of read ports for selecting operands, said multiplexer means receiving data from at least a first of said plurality of read ports during the decode stage and receiving data from at least a second of said plurality of read ports during the read stage; and a functional unit means coupled to receive the output of operands selected by the multiplexer means, the functional unit means for executing, during the execute stage, operations specified by one or more instructions, results of the operations being provided on the result buses.

22. The data path circuit of claim 21, further comprising:

an operand bus, the multiplexer means coupled to the operand bus for transmitting, during the read stage, operands to be written to storage areas other than said register file.

23. The data path circuit of claim 21, wherein said plurality of result buses are coupled to said multiplexer means to provide for a first and second bypass, said multiplexor means retrieving data from said first bypass during said decode stage and from said second bypass during said read stage.

24. The data path circuit of claim 21, wherein said plurality of result buses comprise first, second, and third result buses, and wherein the plurality of write ports comprise first, second, and third write ports respectively coupled to the first, second and third result buses.

25. The data path circuit of claim 21, wherein function unit means comprises first and second arithmetic logical units, a shifter, and a multiplier.

26. The data path circuit of claim 21, wherein potential operands for a first operand in a first pipeline are received by said multiplexer means from said first of said plurality of read ports, while potential operands for a second operand of said first pipeline are received by said multiplexer means from said second of said plurality of read ports.

27. The data path circuit of claim 26, wherein potential operands for a third operand in a second pipeline are received by said multiplexer means from a third of said plurality of read ports during said read stage, while potential operands for a fourth operand of said second pipeline are received by said multiplexer means from a fourth of said plurality of read ports during said read stage.

28. The data path circuit of claim 21, further comprising:

a bypass means coupled to the multiplexer means and the plurality of result buses for allowing a result produced during the execute stage by the functional unit means to be bypassed to the read stage of a subsequent instruction which specifies the result as a source operand.

29. The data path circuit of claim 28, wherein said bypass means is also for allowing said result produced during the execute stage by the functional unit means to be bypassed to the decode stage of said subsequent instruction which specifies the result as said source operand.

30. A data path circuit for processing instructions in a pipelined processor, the data path circuit comprising:

a register file having a plurality of read ports;

a first multiplexer unit, coupled to a first of said plurality of read ports, configured to select a first operand, said first multiplexer unit receiving data from said register file during a decode stage of a first pipeline;

a second multiplexer unit, coupled to a second of said plurality of read ports, configured to select a second operand, said second multiplexer unit receiving data from said register file during a read stage of said first pipeline when necessary; and a third and fourth multiplexer units respectively coupled to a third and fourth of said plurality of read ports, configured to respectively select a third and fourth operand, said third and fourth multiplexer units receiving data from said register file during said read stage of a second pipeline.

31. The data path circuit of claim 30, further comprising:

an operand bus, coupled to said first multiplexer unit, transmitting, during the read stage of said first pipeline, operands to be written to storage areas other than said register file.

32. The data path circuit of claim 30, further comprising:

a set of one or more result buses;

said register file having one or more write ports coupled to corresponding ones of the set of one or more result buses;

a functional unit coupled to receive the first and second operands, the functional unit executing, during an execute stage of said first pipeline, operations specified by one or more instructions, results of the operations being provided on the one or more result buses.

33. The data path circuit of claim 30, wherein said set of one or more result buses are coupled to said first multiplexer unit to provide for a first and second bypass, said first multiplexer unit retrieving results from said first bypass during said decode stage and from said second bypass during said read stage.

34. The data path circuit of claim 30, wherein said first multiplexer unit includes a first multiplexer and a second multiplexer, said first multiplexer coupled to said first of said plurality of read ports and said set of one or more result buses, said second multiplexer coupled to the one or more result busses and coupled to receive the output of said first multiplexer.

35. The data path circuit of claim 30, wherein said second multiplexer unit is coupled to said one or more result buses to provide a third bypass, said second multiplexer unit retrieving results from said third bypass during said read stage.

* * * * *